(12) United States Patent
Sims

(10) Patent No.: US 9,465,513 B2
(45) Date of Patent: Oct. 11, 2016

(54) VISUAL REPRESENTATION OF MAP NAVIGATION HISTORY

(71) Applicant: General Electric Company, Schenectady, NY (US)

(72) Inventor: Oliver William Sims, Newmarket (GB)

(73) Assignee: General Electric Company, Schenectady, NY (US)

( * ) Notice: Subject to any disclaimer, the term of this patent is extended or adjusted under 35 U.S.C. 154(b) by 216 days.

(21) Appl. No.: 13/861,333

(22) Filed: Apr. 11, 2013

(65) Prior Publication Data

US 2014/0310655 A1    Oct. 16, 2014

(51) Int. Cl.
*G06F 3/00* (2006.01)
*G06F 3/048* (2013.01)
*G06F 3/0481* (2013.01)
*G06F 17/30* (2006.01)
*G06F 15/177* (2006.01)

(52) U.S. Cl.
CPC ..... *G06F 3/04817* (2013.01); *G06F 17/30241* (2013.01)

(58) Field of Classification Search
None
See application file for complete search history.

(56) References Cited

U.S. PATENT DOCUMENTS

| | | | |
|---|---|---|---|
| 4,737,916 A * | 4/1988 | Ogawa et al. | 701/532 |
| 6,182,010 B1 * | 1/2001 | Berstis | 701/441 |
| 6,243,091 B1 * | 6/2001 | Berstis | G06F 3/04815 707/E17.111 |
| 6,985,837 B2 * | 1/2006 | Moon et al. | 703/3 |
| 7,089,264 B1 * | 8/2006 | Guido et al. | |
| 7,334,190 B2 * | 2/2008 | Wierowski | G06F 3/0482 715/712 |
| 7,747,962 B2 * | 6/2010 | Othmer | 715/774 |
| 7,978,207 B1 * | 7/2011 | Herf et al. | 345/619 |
| 8,051,089 B2 * | 11/2011 | Gargi et al. | 707/758 |
| 8,090,714 B2 * | 1/2012 | Yang et al. | 707/724 |
| 8,180,370 B2 * | 5/2012 | Kim et al. | 455/456.1 |
| 8,301,372 B2 * | 10/2012 | Herbst | G01C 21/3638 340/995.1 |
| 8,314,789 B2 * | 11/2012 | Fitzmaurice | G06F 3/04815 345/157 |
| 8,339,399 B2 * | 12/2012 | Snow | 345/440 |
| 8,487,957 B1 * | 7/2013 | Bailly et al. | 345/619 |
| 8,565,514 B2 * | 10/2013 | Rohlf et al. | 382/154 |
| 8,606,330 B2 * | 12/2013 | Song et al. | 455/566 |
| 8,676,001 B2 * | 3/2014 | Brucher et al. | 382/306 |
| 8,799,799 B1 * | 8/2014 | Cervelli et al. | 715/765 |
| 8,818,758 B1 * | 8/2014 | Singh | G06F 21/81 702/182 |
| 2002/0075331 A1 * | 6/2002 | Orbanes | G06F 3/0346 715/854 |
| 2002/0085035 A1 * | 7/2002 | Orbanes | G06F 3/0481 715/764 |
| 2002/0089550 A1 * | 7/2002 | Orbanes | G06F 3/0346 715/853 |
| 2002/0163547 A1 * | 11/2002 | Abramson et al. | 345/855 |
| 2005/0132018 A1 * | 6/2005 | Milic-Frayling | G06F 17/30876 709/213 |
| 2006/0101347 A1 * | 5/2006 | Runov et al. | 715/764 |
| 2006/0271287 A1 * | 11/2006 | Gold et al. | 701/211 |
| 2007/0258642 A1 * | 11/2007 | Thota | 382/173 |
| 2008/0016472 A1 * | 1/2008 | Rohlf et al. | 715/848 |
| 2009/0049408 A1 * | 2/2009 | Naaman et al. | 715/835 |
| 2009/0110302 A1 * | 4/2009 | Snow | 382/225 |
| 2009/0210388 A1 * | 8/2009 | Elson et al. | 707/3 |
| 2011/0320450 A1 * | 12/2011 | Liu | G06F 17/30876 707/737 |
| 2014/0218394 A1 * | 8/2014 | Hochmuth et al. | 345/629 |
| 2014/0278070 A1 * | 9/2014 | McGavran | G01C 21/00 701/465 |

* cited by examiner

*Primary Examiner* — Yongjia Pan
(74) *Attorney, Agent, or Firm* — Parks IP Law LLC; Stephen J. Terrell

(57) ABSTRACT

A system includes a processor configured to display a Geographic Information System (GIS) map, derive a data based on a user action associated with the map; associate a thumbnail image to the data; and display the thumbnail image representative of the map.

12 Claims, 5 Drawing Sheets

VISUAL REPRESENTATION OF MAP NAVIGATION HISTORY

BACKGROUND OF THE INVENTION

The subject matter disclosed herein relates to GIS mapping systems.

A geographic information system (GIS), sometimes referred to as a geographical information system or geospatial information system, is a system for capturing, storing, analyzing and managing data and associated attributes which are spatially referenced to the Earth. Such systems can, for example, integrate, store, analyze, share and display geographically referenced information. Geographic information systems can be used for resource management, asset management, sales, marketing, and logistics, among other things.

GIS systems integrate hardware, software, and data for capturing, managing, analyzing, and displaying all forms of geographically referenced information. GIS system s may provide information about the location of items, such as buildings, streets, sewers, lamp posts, etc., as well as information about the items themselves. Unlike a typical map, where only the locations of items are displayed, a GIS map provides "layers" of information. In other words, a GIS map combines layers of information about a given item or location, thereby providing the user with a better understanding of that place. Users may navigate the GIS map using pan, zoom, a search bar, lists, and/or forward and back buttons. It would be beneficial to improve GIS map navigation.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a processor configured to display a Geographic Information System (GIS) map, derive a data based on a user action associated with the map, associate a thumbnail image to the data, and display the thumbnail image representative of the map.

In a second embodiment, non-transitory computer-readable medium comprising instructions executable by processor and configured to display a Geographic Information System (GIS) map, derive a data based on a user action associated with the map, associate a thumbnail image to the data, and display the thumbnail image representative of the map.

In a third embodiment, a method includes displaying a Geographic Information System (GIS) map, deriving a data based on a user action associated with the map, associating a thumbnail image to the data, and displaying the thumbnail image representative of the map.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, various embodiments of historical "thumbnails" or images representative of a larger display may be employed to improve the experience of a GIS map user. A system may include a processor configured to display a Geographic Information System (GIS) map, and derive a thumbnail image representative of the map based on a user action, wherein the user action includes a map navigation action, among others. The map navigation action may include zoom, pan, and otherwise moving the map. The user action may also include a GIS search action, or an action using a navigational pane, such as using "find," "search," "jump-to," and/or other user actions. In certain embodiments, graphical display, such as a pop-up, appears when a user hovers over the thumbnail. In other embodiments, a smart magnifier may magnify one or a plurality of thumbnails, for example, based on certain conditions (e.g., current display size of the thumbnail in square pixels) and/or user actions (e.g., configuring a magnification size). A filter may be employed to manage the user actions that derive a thumbnail image, and the thumbnails may be shared between users. For example, the filter may prevent certain user actions (e.g., small map movements) from triggering the creation of a thumbnail. A plurality of thumbnails images may be stores and/or viewed in a history window.

Figure 1:
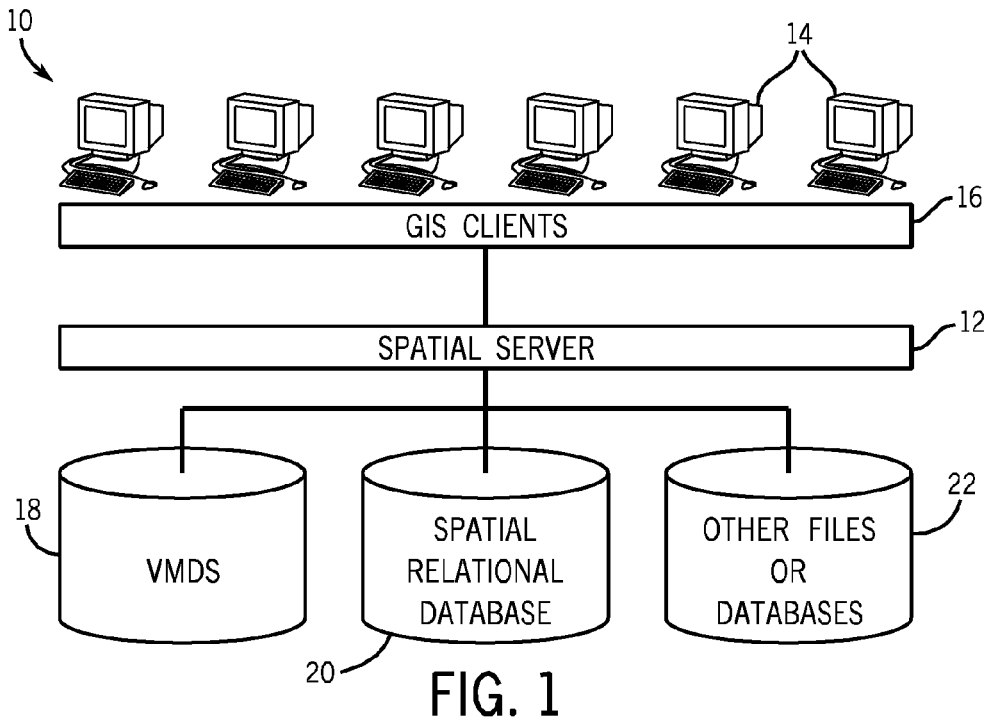
FIG. 1 is a simplified block diagram of an embodiment of a GIS system.

Turning now to the drawings and referring first to FIG. 1, a block diagram of an embodiment of a Geographic Information System (GIS) system 10 is illustrated. In the embodiment shown, the system 10 includes a spatial server 12, and a plurality of client computers 14 communicatively connected to the spatial server 12. In one embodiment, client computers 14 may execute a web browser and/or a client software application, such that spatial server 12 is accessible to client computers 14 over a network, such as the Internet and/or an intranet. Client computers 14 may be interconnected to the Internet through many interfaces including a network, such as a local area network (LAN), a wide area network (WAN), dial-in-connections, cable modems, wireless modems, and/or special high-speed Integrated Services Digital Network (ISDN) lines. As described above, client computers 14 may be any device capable of interconnecting to the Internet, including a personal computer, portable computer, a tablet, a server, a router, a network computer, a vendor or manufacture's computing device, smart grid components, a peer device, a smart phone, etc., and may allow a GIS client 16, such as a human user or a software entity, to use the GIS system 10. As shown, the plurality of GIS clients 16 may connect to the spatial server 12.

The spatial server 12 may include memory capable of containing information on a variety of matters, such as information relating to one or more areas of interest of the GIS client 16, executable computer instructions, and the like, as well as a processor suitable for executing the computer instructions. Information from the spatial server 12 may be accessed by potential clients or users 16 at one of the client computers 14 by logging onto the spatial server 12. In an alternative embodiment, memory may be stored remotely from the spatial server 12, and may be non-centralized. The spatial server 12 may functionally interface with one or more databases to store geospatial information and/provide for a variety of functions, such as but not limited to publishing maps, sharing maps, providing for web services, providing for spatial analysis (e.g., vector, raster, network, and/or 3D analysis), providing for geographic display of conflicts and conflict resolution, delivering development tools and tool support, transforming between coordinate systems, managing versioned data stores, and so on. As described in more detail below, geospatial information includes, for example, a climate model related to the areas of interest, weather conditions related to the areas of interest, and/or terrain data related to the areas of interest. Moreover, the business decision rules are based on, for example, previously stored values of object properties, previous outcomes associated with the previously stored values, and/or a cost model associated with objects and/or projects. The objects can include, for example, hardware parts for use in completing projects or any other suitable database objects.

The spatial server 12 may connected to a version managed data store (VMDS) 18, the spatial relational database 20, and other files or databases 22. The VMDS 18 may store and analyze the spatial and topological networks that the GIS clients 16 may utilize. The VMDS 18 may include a variety of relational database features, such as attribute querying, join fields, triggers, and calculated fields. In addition, VMDS 18 has numerous spatial and topological capabilities, which may allow data such as points, texts, polylines, polygons, and raster data to be stored and analyzed. In the VMDS 18, spatial and attribute data are stored in data blocks, which reside in data store files on the server. When the GIS client 16 requests data, the VMDS 18 may determines a more optimum set of data blocks that are required, and then returns the data to the client 16 via the network for processing. Spatial functions of the VMDS 18 include: find all features within a polygon, calculate the Voronoi polygons of a set of sites and perform a cluster analysis on a set of points. Vector spatial data such as points, polylines, and polygons can be given topological attributes that allow networks to be modeled. All VMDS 18 data is presented as objects.

In some embodiments, the VMDS 18 is a database that is optimized to store and query data that is related to objects in space, including points, lines, and polygons. The database may use spatial indices to find values for spatial queries. Query types such as spatial measurements (e.g., finding the distance between points, polygon area, etc.), spatial functions (e.g., modifying existing features to create new ones), spatial predicates (e.g., allowing true/false queries), constructor functions (e.g., creating new feature by specifying the vertices that can make up lines), and observer functions (e.g., queries that return specific information about a feature) may all be operations supported by the VMDS 18.

The spatial server 12 may also connect to the spatial relational database 20. The spatial relational database 20 may be an integrated set of functions and procedures that enables spatial data to be stored, accessed, and/or analyzed more quickly and efficiently in a database, such as the spatial server 12 or the VMDS 18. The spatial relational database 20 may provide a SQL schema and functions that facilitate the storage, retrieval, update, and query of collections of spatial features in a relational database. The database 20 may include the following components: a schema that prescribes the storage, syntax, and semantics of supported geometric data types; a spatial indexing mechanism; a set of operators and functions for performing area-of-interest queries, spatial join queries, and other spatial analysis operations; and administrative utilities.

The GIS client 16 may enter commands and information into the system 10 via an input device. Examples of such input devices include, but are not limited to, a keyboard, a pointing device (e.g., a mouse), a microphone, a joystick, a scanner, tactile input devices such as gloves and other body coverings, body movement, and the like. In certain embodiments, the GIS client 16 may engage with the system 10 via an interface, such as a display device (e.g., a monitor, and LCD, or a projector). In this way, a screen may display graphical, textual, animation, audio, tactile, or other information from the GIS server 12 to the GIS client 16. The GIS client 16 may manually or automatically manipulate the information displayed by the user interface. For example, the GIS client 16 may input a variety of navigational and search actions into the system 10. More specifically, the GIS client 16 may pan, zoom, or otherwise change the field of vision on the map, or the client 16 may search for a specific object or location, "jump to" a specific object or location by making a selection from a list, or be linked directly to a specific object or location. To access a previous map view, traditional navigational buttons, such as "forward" and "back" may be employed. Alternatively, the GIS client 16 may access a previous map view by selecting the previous map view from a plurality of historical thumbnails (described in FIGS. 2 to 6 below). The historical thumbnails may improve the efficiency of map navigation within the GIS system 10 by allowing the GIS clients 16 to more efficiently find and use the GIS map.

Figure 2:
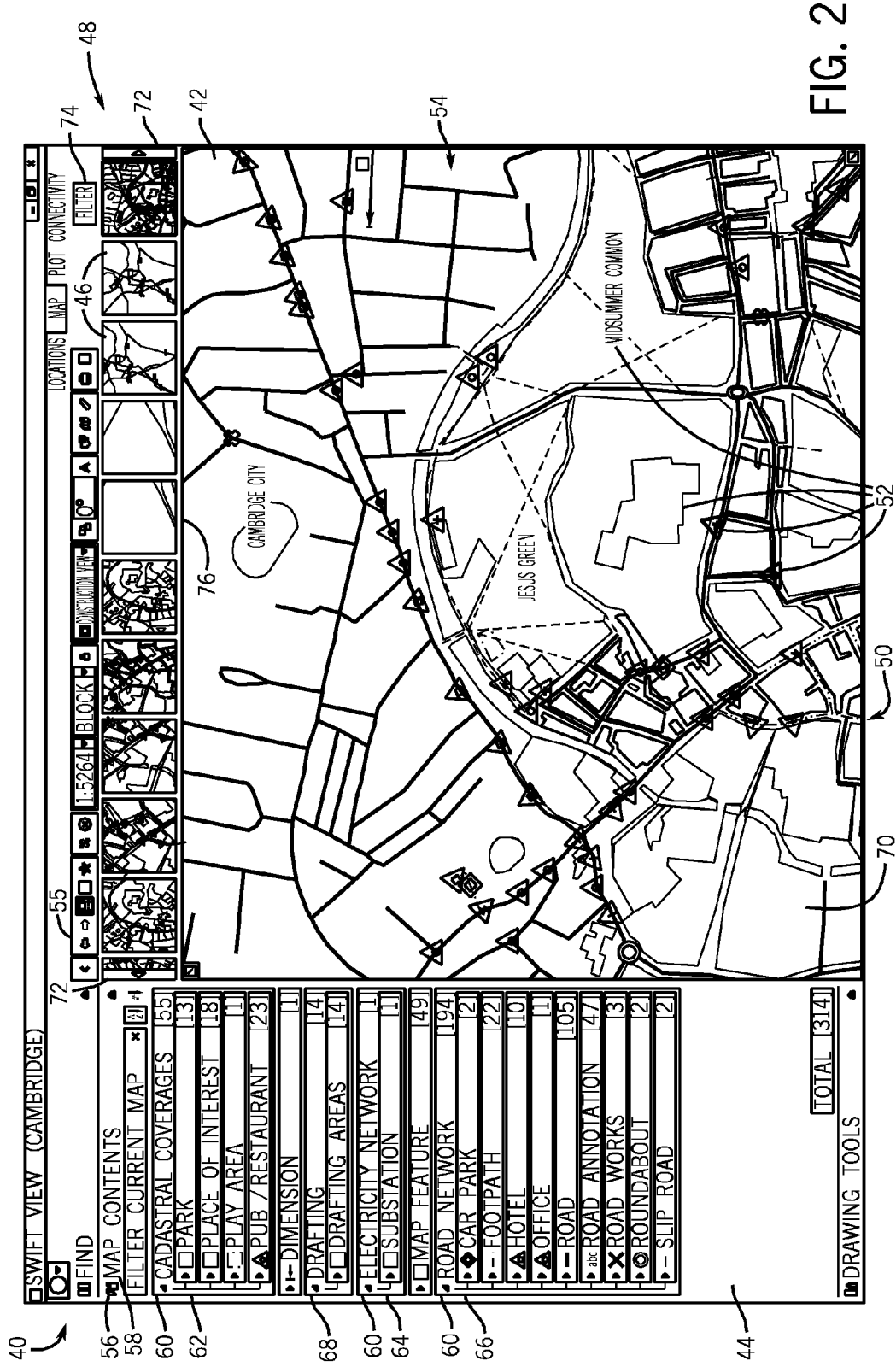
FIG. 2 is an embodiment of a GIS map having thumbnails.

FIG. 2 illustrates an embodiment of a user interface 40 of the GIS system 10. The embodiment includes a map 42, a navigation panel 44, and a plurality of historical thumbnails 46 arranged in a thumbnail group 48. The map 42, the navigation panel 44, and the thumbnail group 48 may be displayed together on a map view or page 50. In the depicted embodiment, the map 42 may show the locations of cities, roads, political boundaries, as well as data that indicates the Earth location (latitude and longitude, or height and depth)

of a variety of objects and/or systems. The GIS system 10 is not limited to handling large scale geographic data, though. Other types of data, such as data from networked systems (e.g., physical networks, functional networks, communication networks), power distribution systems, public utility systems may be used. Other systems include computer-aided design (CAD) and/or computer-aided manufacturing (CAM) systems used, for example for an automobile engine or printed circuit boards. The relative locations of objects or features in smaller systems such as these may be displayed in the GIS map 42.

The map 42 may show geographic data, such as geographic information including, but not limited to, the locations of addresses, roads, elevation, cities, and political boundaries, overlaid with other types of data, such as data regarding restaurants, hotels, census information, rainfall, industrial sites, or electric grids. A viewable area 54 on the map 42 may be changed by user navigation actions such as panning, zooming, and/or or dragging the map 42 up, down, left, right, or any combination thereof. The user 16 navigation actions may also include a GIS search action (e.g., typing on a search field), or using a navigation bar 55 as shown at the top of the map view page 50. The navigation bar 55 may include web browser-like navigation functions such as forward and back (e.g., previous and next) buttons, and a refresh button, which, when selected, may change the viewable area 54.

The navigation panel 44 may contain a variety of information and tools to educate the user and to enable the user to navigate the map 42. For example, as shown, the navigation panel 44 includes a variety of map navigation tools, including a search tool 56, which may allow the GIS client 16 to input the name of map features (e.g., an object, area, location, or other point of interest) that may be found on the map 42. A list of search results may be derived, from which the user 16 can select a map feature 52 he wishes to view and/or navigate to. When the user selects the feature 52, the viewable area 54 may change to display the selected feature 52. Additionally, a node tree 58 may present map feature(s) 52 to be displayed on the map 42. For example, the user 16 may use the node tree 58 to remove roads from the map view 54, or to only show the electricity network. The navigation panel 44 may also have lists 60 of features 52, such as drop down lists, which the user 16 may select. Once the user 16 has selected a feature 52, the map 42 may "jump to" that feature 52. In the illustrated embodiment, listed features 52 include cadastral coverages 62, electricity networks 64, and road networks 66. The navigation panel 44 may also include a drafting tool 68 that enables the user 16 to create a new map feature 52, and/or other tools. While the navigation panel 44 is displayed on the left side of the map view page 50, the panel 44 may, in certain embodiments, be displayed on the right side, and may be presented as a collapsible, resizable, and/or movable window or pop-up window, thereby allowing a larger viewable area 54 of the map 42.

A plurality of historical thumbnails 46 may be displayed adjacent to the map 42 in FIG. 2. The thumbnails 46 may be images (e.g., static bitmap images or dynamically created images) that show previous map views 70 (e.g., the viewable area 54 previously shown on the map 42), and when selected, the thumbnail 46 may link or otherwise navigate the user 16 to the map view 70 displayed in or associated with the thumbnail 46. In one example, the user may use the thumbnail 46 to change the current map view 70 into a map view shown in the selected thumbnail 46. The thumbnails 46 may allow the user 16 to quickly navigate to previous map views 70 without inputting more information.

Thumbnails 46 may be derived any time the viewable area 54 of the map 42 changes. For example, the thumbnail 46 may be derived as a result of user navigation actions (e.g., zooming, panning, rotating, performing a GIS search, using the navigation bar 55, using the navigation panel 44, etc.). Each user navigation action may trigger the creation of a new thumbnail 46, which is directly added to the thumbnail group 48. Accordingly, the thumbnail group 48 may include thumbnails 46 showing the most recent map views 70, ordered by, for example, time of creation. Any number of thumbnails 46 may be included in the thumbnail group 48. For example, ten thumbnails 46 are displayed in one row in the thumbnail group 48 in FIG. 2, but the system 10 may include 1 to 50, 1 to 25, or 1 to 10 thumbnails 46 in any number of rows or columns. The thumbnails 46 may be arranged in chronological order, from left to right, for example, with each newly produced thumbnail 46 "bumping" the older thumbnails 46 over to make room for the new one. As shown, arrow buttons 72 may allow the user to scroll through the thumbnails 46 in the thumbnail group 48, so while ten thumbnails 46 may be viewable at one time in FIG. 2, any number of thumbnails 46 may be accessed from the map view page 50. Using the historical thumbnails 46 may allow the user 16 to more efficiently navigate to and from previous map views 70 by removing the need for the user to use the map 42 to display intermediate map views 70 (e.g., map views 70 chronologically between the current view 70 and the desired view 70), as it would if the user 16 depended solely on tools such as the forward and back buttons in the navigation bar.

The system 10 may be set to derive new thumbnails 46 whenever the map view 70 changes, such as after predetermined user actions like panning, zooming, selecting a new object or location from the navigation panel 44, and/or selecting a thumbnail 46. In certain embodiments, a thumbnail filter 74 may be employed to modify or control events that trigger thumbnail 46 derivation. For example, in some embodiments, the thumbnail filter 74 may be configured to only allow the creation of a new thumbnail 46 when the map 42 has been zoomed, panned, or rotated past a threshold value, such as a number of longitudinal or latitudinal degrees, a certain geographical distance, a certain percent change in the map view 70, a threshold movement of the input device (e.g. mouse, keyboard, body), etc. In other embodiments, for example, the thumbnail filter 74 may limit the creation of new thumbnails 46 based on the selection of different, roads, cities, addresses, etc., from the navigation panel 44. Furthermore, the thumbnail filter 74 may be configured to control what kinds of information are included in the thumbnail 46 itself. For example, the filter 74 may be configured to include only certain types of map features 52 in the thumbnail 46, or it may exclude certain types of map features 52. This may allow the user 16 to more quickly and easily identify the relevant information in each thumbnail 46, and may enable the user 16 to more efficiently find and navigate to a particular thumbnail 46 of interest, and therefore a particular previous map view 70.

Each thumbnail 46 may be a bitmap image (e.g., a static image) of a previous map view 70, or the thumbnail 46 may be interactive (e.g., the image in the thumbnail 46 may be created based on stored GIS information and then panned, zoomed, etc.). An interactive thumbnail 46 may enable the user 16 to manage what is shown in the historical thumbnails 46 by panning, zooming, or rotating the image in the thumbnail 46. In certain embodiments, the thumbnails 46 may be resizable. For example, the thumbnails 46 in the thumbnail group 48 may be enlarged or shrunk by selecting and dragging a bottom edge 76 of the thumbnail group 48 up or down. If the thumbnail 46 is a static image, enlarging the thumbnail 46 may increase the size of the image that is shown. In embodiments where the thumbnail 46 is interactive, enlarging the thumbnail 46 may cause more information to be displayed.

Figure 3:
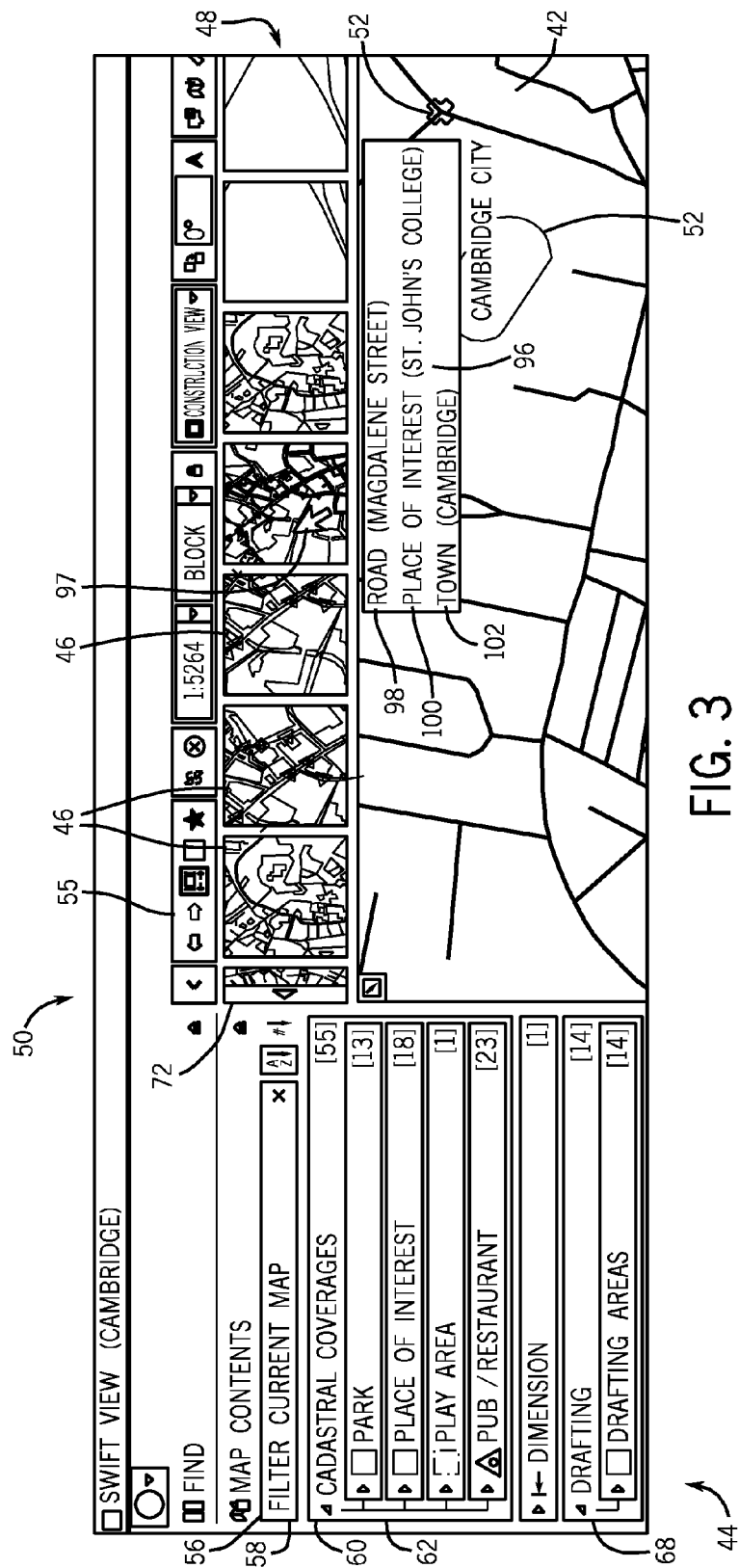
FIG. 3 is an embodiment of a GIS map having the thumbnails of FIG. 2 with an informational display.

In some embodiments, to help users 16 more quickly identify what is in the thumbnail 46, the user 16 may cause a pointing device (e.g., cursor) to hover over the thumbnail 46 and display an informational display or pop-up 96, as shown in FIG. 3. The pop-up 96 may appear when the user 16 hovers over the thumbnail 46 with a pointing tool (e.g., a mouse 97) and the pop-up 96 may display the most pertinent information shown in the map 42. In FIG. 3, the pop-up 96 displays a major road name 98, a primary place of interest 100, and a town name 102, but the system 10 may show more or less information, and it may be configured to show other types of information as well. For example, if the GIS client 16 is primarily interested in information regarding electricity networks 68, the pop-up 96 may show information about the electric grid in the area shown in the thumbnail 46. In certain embodiments, the information in the pop-up 96 may change as the user 16 hovers on different areas of the thumbnail 46. If the user 16 hovers over a specific feature 52 of the map 42 in the thumbnail 46, the pop-up 96 may display information about that specific feature 52. In this way, different information may be shown in the pop-up 96 in response to the user's actions.

The pop-up 96 may also provide a gateway to other map 42 tools, such as a variety of thumbnail management options. For example, in certain embodiments, the pop-up 96 may include a tool that allows the user 16 to mark the thumbnail 46 as a favorite. The system 10 would then add the selected "favorite" thumbnail 46 to a list 60 of favorites, allowing easy access to that thumbnail 46. Additionally, the pop-up 96 may include search and/or filter functions, as well as an option to delete or hide the thumbnail 46 if the user 16 does not wish it to be displayed. The pop-up 96 may furthermore include a share feature, allowing the user 16 to share the thumbnail 46 with another GIS user 16 via the GIS server 12. For example, the pop-up 96 may provide a link to the thumbnail 46, which the user 16 may copy and send to enable a different user 16 to access the thumbnail 46. The copying may be done automatically, such as when an "always share" option is selected.

Figure 4:
FIG. 4 is an embodiment of a GIS map having the thumbnails of FIG. 2 and a smart magnifier.

In certain embodiments, a magnifying tool may further help a user determine what is in a particular thumbnail 46. As shown in FIG. 4, a user input may transform the pointing tool into a dynamic magnifier 122. The magnifier 122 may be a circle, rectangle, polygon, or any suitable shape that may be moved over thumbnails 46 in the thumbnail group 48 to enlarge thumbnails 46 of interest. As shown, the area of the map 42 inside the magnifier 122 is magnified. The user may move the magnifier 122 in any direction across the thumbnails by moving an input device (such as the mouse 97). In this way, the user 16 may "point" to the thumbnail or a portion of the thumbnail, and that area will magnify. As the magnifier 122 moves over the thumbnails 46, the area under the magnifier 122 may be enlarged. In certain embodiments, the magnifier 122 may enlarge the thumbnail from 1 to 300%, 1 to 200%, 1 to 100%, 1 to 50%, or any amount therein. Furthermore, a function may be included in the system 10 that enables the user 16 to modify the degree of magnification by the magnifier 122. The magnifier 122 may be set to appear based on sizes of text, GIS objects, and so on, underlying the pointing tool. The magnifier 122 may be additionally or alternatively set to magnify only certain display items, such as text, roads, power lines, and so on, or to magnify the entire area underlying the magnifier 122.

The user 16 may use the magnifier to see additional details of the thumbnails 46, helpful in finding a particular thumbnail 46. When the user 16 is ready to select the particular thumbnail 46, a user action (such as double clicking, right clicking, typing a keyboard input, or pressing and holding the pointer) may turn off the dynamic magnifier 122 and enable the user 16 to select the thumbnail 46. The magnifier 122 may also be employed to enlarge portions of the map 42 and/or the navigation panel 44. For example, the user 16 may use the dynamic magnifier 122 to magnify a portion of the map 42 without magnifying the entire map 42, or the user 16 may magnify a portion of the lists 60. In some embodiments, the dynamic magnifier 122 may be a smart magnifier 122 that allows the user to filter what is magnified. For example, a user 16 particularly interested with roads in the thumbnail 46 may filter the magnifier 122 to only magnify roads or road names. Alternately, the filter may exclude particular map features, such as roads or road names, from being magnified. The dynamic magnifier 122 may allow users 16 to more readily identify points of interest in the thumbnails 46, thereby increasing the user's 16 navigational efficiency.

Figure 5:
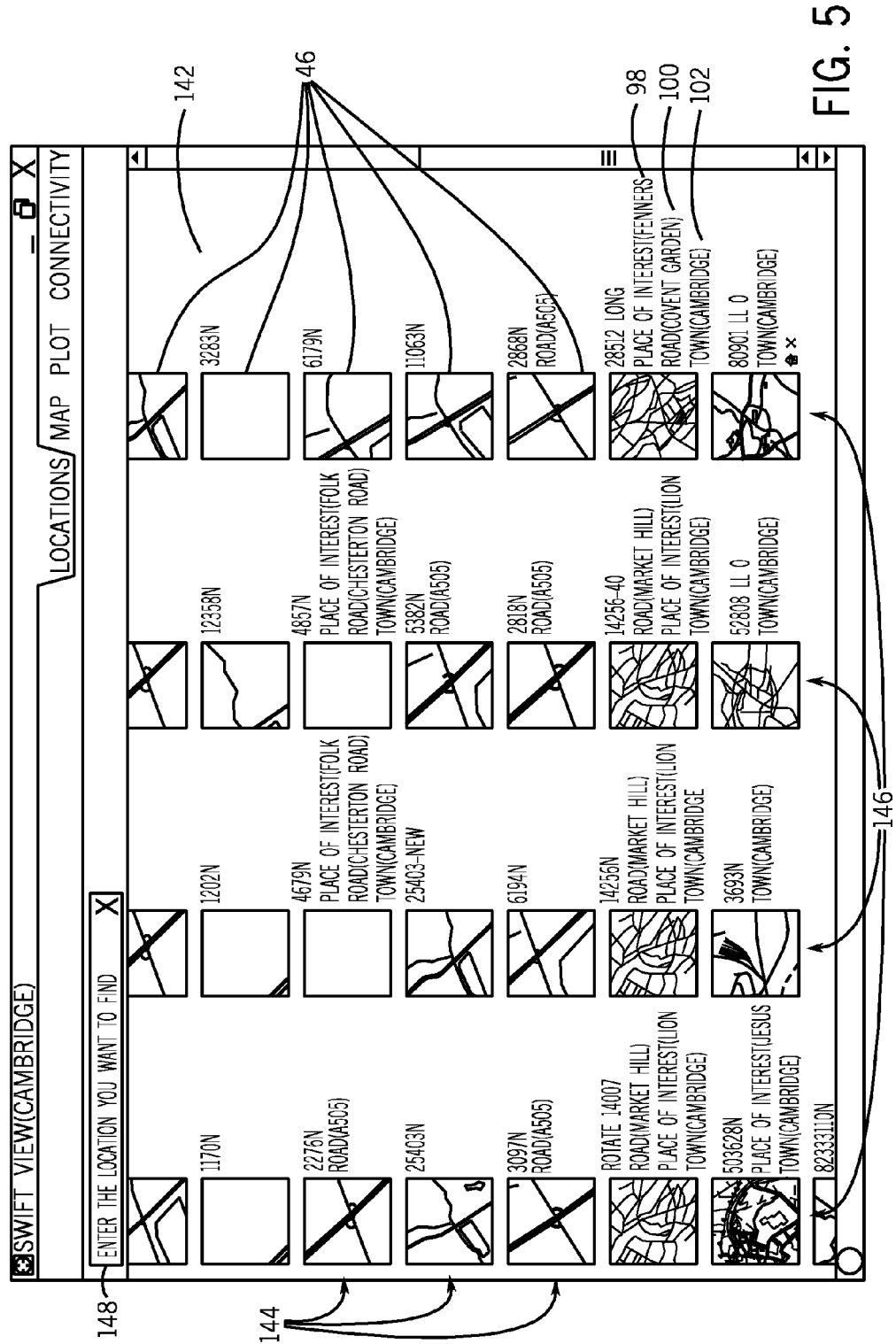
FIG. 5 is an embodiment of a history page for a GIS system, having the thumbnails of FIG. 2.

FIG. 5 shows an embodiment of a thumbnail window 142, which shows a larger number of thumbnails 46 than the number shown in the thumbnail group 48 on the map view page 50. The thumbnail window 142 allows the user 16 to quickly view a large number of thumbnails 46, and the window 142 may be viewed separately or concurrently with the map 42. When a user 16 selects a thumbnail 46 from the thumbnail window 142, the system 10 may display the map view 70 shown in the thumbnail 46 in full size (e.g., on the map 42). The window 142 may display the thumbnails 46 in a plurality of rows and columns, which may be arranged chronologically from when they were derived, or they may be arranged according to the content in the thumbnails, or in any other suitable order.

In the embodiment shown in FIG. 5, 29 thumbnails 46 are shown in seven rows 144 and four columns 146, but the thumbnail window 142 may be configured to display more or fewer thumbnails 46 in more or fewer rows 144 and columns 146. For example, the thumbnail window 142 may show 1 to 500, 1 to 100, 1 to 50, 1 to 10 thumbnails 46, or any combination therein. Information about the thumbnail 46 may be displayed adjacent to each thumbnail 46. In the embodiment shown, information such as the town name 98, the major roads 100, and the places of interest 102 found in each thumbnail 46 are shown to the right of each thumbnail 46. This information may also be displayed via informational pop-ups 96, which, as described in FIG. 3, may be shown when the user 16 hovers over the thumbnail 46.

In certain embodiments, the user 16 may user the magnifier 122 to enlarge thumbnails 46 of interest in the thumbnail window 142. In other embodiments, the user 16 may zoom in on the thumbnail window so all of the thumbnails 46 in the window 142 are enlarged, thereby enabling the user 16 to identify more details in the thumbnails 46. To further help users 16 find thumbnails 46 of interest, the thumbnail window 142 may include a search tool 148. The user may type or input one or a combination of map features 52, such as road names, geographical features, or places of interest, and the thumbnail window 142 may filter out thumbnails 46 that do not include the searched item(s). The search tool 148 may allow users 16 to more efficiently locate a particular thumbnail 46 out of a large number of thumbnails 46.

As in FIGS. 2 to 4, the thumbnails 46 in the thumbnail window 142 may be static or interactive. A static thumbnail 46 may be a bitmap or other capture of the map view 70 at the time of thumbnail 46 creation. Manipulation of the static thumbnail 46 may include resizing, or other image-based manipulation. Dynamic or otherwise interactive thumbnails 46 may enable the user 16 to perform a larger variety of navigational actions, (e.g., zoom, pan, rotate, search, find, filter, etc.) on the map view 70 shown in the thumbnail 46. In addition, the interactive thumbnail 46 may allow the informational pop-up 96 to update the displayed information in response to the location of the pointer (e.g., the mouse 97) on the thumbnail 46, and in response to navigational actions such as those listed above.

Figure 6:
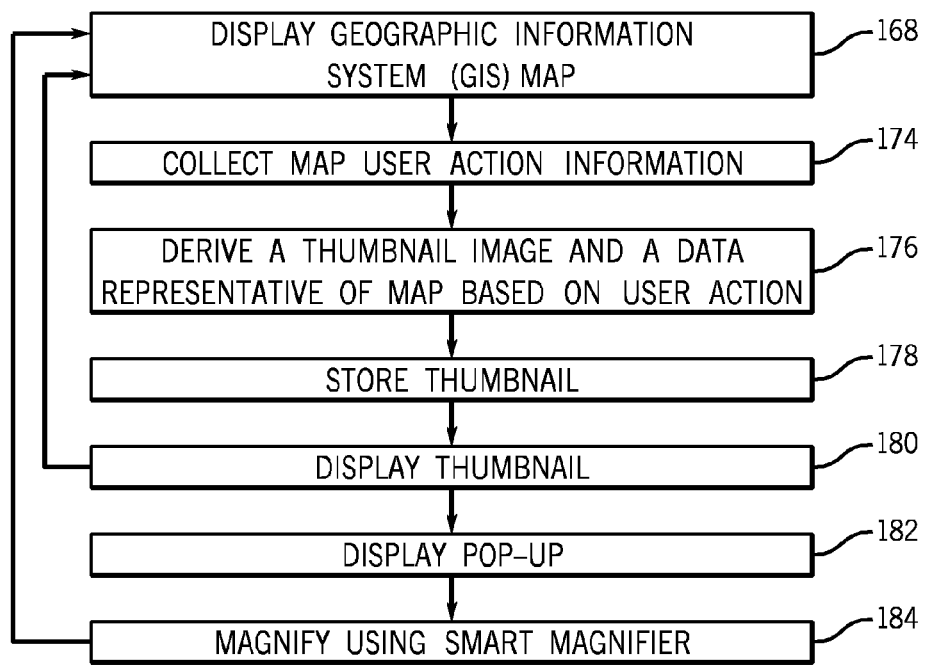
FIG. 6 is a flowchart illustrating an embodiment of a process suitable for creating the thumbnails of FIG. 2.

FIG. 6 illustrates an embodiment of a process 166 suitable for implementing the techniques described herein. The process 166 may be stored in a computer readable medium including non-transitory instructions executable by a processor, such as the processors of the systems 14. First, the process 166 displays the GIS map 42 (block 168). The user 16 may then view the GIS map 42. As described in FIG. 2, the user 16 may view the map 42 via a user interface device such as a display screen. The user 16 may then perform a map navigation action, such as panning, zooming, rotating, searching, selecting the feature 52 from the list 60, etc. The process 166 collects the user 16 map navigation action information (block 174) and uses that information to derive the thumbnail image 46 representative of the map 42 (block 176). The thumbnail 46 may be a bitmap image, or the thumbnail 46 may be displayed based on stored GIS information suitable to interactively displaying the thumbnail 46, as described in FIGS. 2 to 5. Further, data may be collected and associated with the thumbnail 46 that may be useful in linking the thumbnail 46 to the map 42. The data may include map coordinates, objects, object to object relationships, or other components useful in navigating to a section of the map 42 or otherwise reconstructing the map 42. The data may additionally include GIS information used in creating the thumbnail 46. Indeed, in one embodiment, the thumbnail 46 may be created dynamically based on the data.

The thumbnails 46 may be stored (block 178) in a thumbnail group 48 and/or in the thumbnail window 142. Both the thumbnail group 48 and the thumbnail window 142 may display a plurality of thumbnails 46 to the user 16 (block 180) at one time. The user 16 may then select a thumbnail, which will cause the process 166 to begin again, and display a GIS map 42 (block 168), or the user may look for more information in the thumbnail 46. If the user 16 hovers a pointer over the thumbnail 46, the process 166 may display a pop-up 96 (block 182), showing information about the map view 70 captured in the thumbnail 46. Additionally, the process 166 may magnify the thumbnail 46 (block 184) if the user 16 chooses to use the smart magnifier 122 or if the smart magnifier 122 is set to automatically turn on at certain underlying text, image, or other object sizes. The user 16 may then select the thumbnail 46 of interest, thereby causing the process 166 to return to the beginning and redisplay the GIS map (block 168) based on the data associated with the thumbnail 46 (e.g., map coordinates, objects).

Technical effects of the invention include a processor configured to display a Geographic Information System (GIS) map 42 and derive a data based on a user action associated with the map 46. The processor associates a thumbnail image to the data, and displays the thumbnail image representative of the map 42. The data may comprise a map coordinate, a map object 52, a map object relationship, or a combination thereof. The user action may include zooming the map 42, panning the map 42, rotating the map 42, performing a GIS search action, etc. The processor may be configured to navigate to a section of the map 42 based on a selection of the thumbnail image 46. Using the thumbnail 46 may increase the navigational efficiency of the user 16 when using the GIS map 42 by enabling the user 16 to quickly find and navigate to previous map views 70.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    a processor;
    a computer-readable medium comprising instructions that, when executed by the processor, cause the processor to:
        generate, responsive to a user action associated with changing a viewable area of a geographic map from a first area of the geographic map to a second area of the geographic map, if the change in the viewable area of the geographical map exceeds a pre-determined threshold, a historical thumbnail image associated with one of:
            the first area of the geographic map; and
            the second area of the geographic map; and
        display the historical thumbnail image such that the historical thumbnail image is viewable independent of a subsequent change in the viewable area of the geographic map, wherein selection of the historical thumbnail image causes the processor to display the associated one of the first area of the geographic map and the second area of the geographic map.

2. The system of claim 1, wherein the user action comprises at least one of zooming the geographic map, panning the geographic map, dragging the geographic map, filtering the geographic map, and rotating the geographic map.

3. The system of claim 1, comprising instructions that, when executed by the processor, cause the processor to, responsive to a pointer hovering over the historical thumbnail image, at least one of:
    display an informational pop-up; and magnify the historical thumbnail image.

4. The system of claim 1, comprising instructions that, when executed by the processor, cause the processor to share the historical thumbnail image with a remote user.

5. The system of claim 1, wherein the historical thumbnail image is an image of the associated one of the first area of the geographic map and the second area of the geographic map.

6. The system of claim 5, wherein the historical thumbnail image includes a reduced number of features with respect to the associated one of the first area of the geographic map and the second area of the geographic map.

7. The system of claim 1, wherein the instructions further cause the processor to display a plurality of historical thumbnail images;

wherein each of the plurality of historical thumbnail images is viewable independent of a subsequent change in the viewable area of the geographic map; and wherein each of the plurality of historical thumbnail images is associated with a previously displayed area of the geographical map.

8. The system of claim 7, wherein the plurality of historical thumbnail images are ordered by time of creation.

9. The system of claim 1, wherein the pre-determined threshold includes one of a number of longitudinal or latitudinal degrees, a certain geographical distance, a certain percent change in a displayed area of the geographical map, and a threshold movement of an input device.

10. The system of claim 1, wherein generating the historical thumbnail image includes storing data associated with displaying the associated one of the first area of the geographic map and the second area of the geographic map.

11. The system of claim 1, wherein the user action comprises a search action.

12. The system of claim 11, wherein the search action displays the second area of the geographic map responsive to user input including at least one of a map coordinate, a map object, a map relationship, a map feature, an area, a location, and a point of interest.

* * * * *